Nov. 8, 1927.

J. VAUTIER 1,648,467

DEVICE FOR PROTECTING LIQUID CONTAINERS FROM BURSTING

Filed May 31, 1922 2 Sheets-Sheet 1

Nov. 8, 1927.
J. VAUTIER
1,648,467
DEVICE FOR PROTECTING LIQUID CONTAINERS FROM BURSTING
Filed May 31, 1922
2 Sheets-Sheet 2
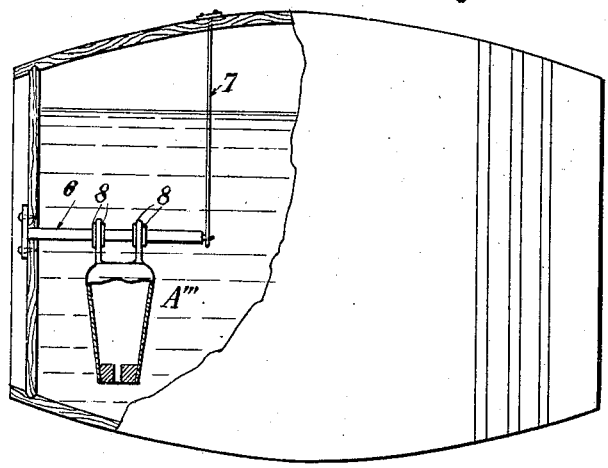

Patented Nov. 8, 1927.

1,648,467

UNITED STATES PATENT OFFICE.

JULES VAUTIER, OF NOISY-LE-GRAND, FRANCE.

DEVICE FOR PROTECTING LIQUID CONTAINERS FROM BURSTING.

Application filed May 31, 1922, Serial No. 564,956, and in France May 1, 1922.

It is a known fact that water will increase in volume under the action of a freezing temperature and will cause the bursting of reservoirs which become closed by the formation of ice. My invention is intended to entirely obviate this drawback by the use of a device of a very simple character.

The said device is constituted by adding to the reservoir to be protected a receptacle having any suitable shape but preferably elongated in the vertical sense, which is immersed in the liquid, and is open only at the lower part below the plane of the lowest level of the liquid. The said receptacle contains air in such manner as to provide a space in to which the water may enter by compressing the air, and this will prevent any undue expansion or bursting of the said reservoir. The air chamber will be given a volume depending upon the contents of the reservoir, for example five thousandths of the said contents.

The said air receptacle is preferably constructed of a non-rusting metal, and can be secured to the reservoir by any suitable means. It is preferably mounted in a removable manner so that it can be removed from the water at intervals in order to allow it to become properly filled with air to replace the air which dissolves in the water after a certain length of time. In the case of stationary reservoirs, it will be convenient to constitute the air receptacle in such manner as to form a float which will serve to indicate at the same time the level of the liquid in the reservoir.

The invention is applicable to all reservoirs, casks, tank wagons and the like which are exposed to freezing.

The accompanying drawings show by way of example various embodiments of the invention.

Figure 1:
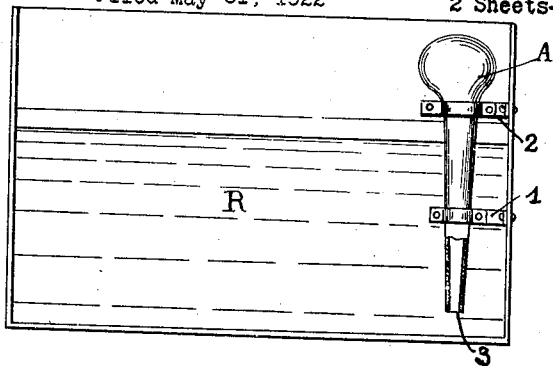
Figure 2:
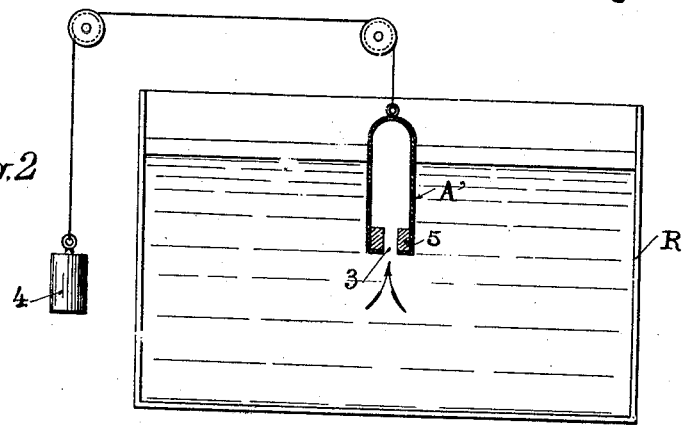

Fig. 1 shows a reservoir with an air receptacle removably secured to the wall of the reservoir. Fig. 2 is an arrangement wherein the device has the form of a level-indicating float. Fig. 3 shows the device as applied to a cask.

In Fig. 1, the reservoir R is provided with the air receptacle A which is disposed simply in the two holders 1 and 2 secured to the wall of the reservoir, in such manner that it may be removed as desired. Only the lower end 3 is open, and it is situated at a level which is below the lowest level of the water in the reservoir. In case of freezing, the layer of ice which is formed in the first place at the upper part will wholly or partially close the reservoir A, and the increase in volume occasioned by the gradual freezing of the lower layers will force the water into the receptacle, compressing the air in the upper part of the same, thereby obviating the bursting of the reservoir.

In Fig. 2, the air receptacle A' is constituted by a metal container which forms a level-indicating float. It is connected for this purpose with the weight 4 in the known manner. The said container is open at the bottom at 3 and is ballasted at the lower part by a certain thickness of metal 5 so as to occupy the vertical position at all times. The said float is given a sufficiently elongated form in the vertical sense in order that its orifice shall not become obstructed by the ice which forms around the upper part and encloses the volume of water remaining in the reservoir.

Fig. 3 represents an application of the invention to casks, whereby the same can be rolled without removing the said device or preventing it from serving the desired purpose. To one head of the cask, and preferably on the axis, is secured a rod 6 for example of hard wood which is held at the outer end by cross-pieces or a cross frame 7, and the receptacle A''' is supported by the rod 6 and is revoluble thereon. The stop-pieces 8 prevent the receptacle from sliding along the said rod. It will be observed that casks provided with the said device can be handled for purposes of transportation in cold climates or during freezing periods, and they may be piled up with facility. It is obvious that the receptacle A''' is made of a suitable material such as pottery, whereby the liquid shall not be injured nor its taste altered.

I claim:

1. In combination, a congealable liquid container, an air receptacle floating in the liquid of said container and having a restricted opening in its lower portion extending into the liquid, a weight about the opening in said air receptacle so that the air receptacle will at all times remain in a vertical position, said opening establishing communication between the interior of the air receptacle and the liquid of the container to prevent bursting thereof when subjected to freezing temperature.

2. In combination, a reservoir for congealable liquid, an air receptacle floating in the liquid in the reservoir, said receptacle having its lower extremity open and extending into the liquid below the level thereof and its upper end closed and projecting above the liquid, the lower open extremity being provided with a weight about its orifice so that the air receptacle will remain vertical while floating, a counterweight positioned exteriorly of the reservoir, and flexible means connecting the counterweight to the receptacle.

3. The combination with a freezing liquid container, of an air receptacle floating in the liquid of said container and having a restricted opening in the lower end thereof, said opening communicating the interior of the receptacle with the liquid in the container to prevent the bursting of the container when subjected to freezing temperature, a counterweight, and flexible means connecting said counterweight to the receptacle for maintaining the latter in the liquid irrespective of any variation in the depth of the liquid.

In testimony whereof I affix my signature.

JULES VAUTIER.